United States Patent [19]

van der Wal

[11] Patent Number: 4,703,514
[45] Date of Patent: Oct. 27, 1987

[54] PROGRAMMED IMPLEMENTATION OF REAL-TIME MULTIRESOLUTION SIGNAL PROCESSING APPARATUS

[75] Inventor: Gooitzen S. van der Wal, Mercer County, N.J.

[73] Assignee: RCA Corporation, Princeton, N.J.

[21] Appl. No.: 776,474

[22] Filed: Sep. 16, 1985

[51] Int. Cl.[4] .............................................. G06K 9/36
[52] U.S. Cl. ...................................... 382/41; 358/284
[58] Field of Search ...................... 382/41, 27, 49, 54, 382/56; 358/284

[56] References Cited

U.S. PATENT DOCUMENTS 4,083,035 4/1978 Riganati et al. ........................ 382/27
4,622,632 11/1986 Tanimoto et al. .................. 364/200

OTHER PUBLICATIONS

"Modular VMEbus Imaging Boards Target Machine Vision," by R. L. Birenbaum et al., Imaging Technology Incorporated, dated Jan. 20, 1985, pp. 1–13 and FIGS. 1–5.

Primary Examiner—David K. Moore
Assistant Examiner—Jacqueline Todd
Attorney, Agent, or Firm—Allen LeRoy Limberg; George J. Seligsohn

[57] ABSTRACT

Multiresolution processing apparatus (which may be programmed as pyramid processing apparatus) comprised of a filter logic unit comprised of one or a plurality of identical interconnected programmable modules; a set of programmable multiplexers (MUX), a plurality of programmable random access-memories (RAM), and a timing and control means including an instruction memory for programming the flow of information data through and the operation of the filter logic unit, the set of MUX and the plurality of RAM. This permits a single stage to sequentially operate as each separate stage of an FSD or Burt Pyramid analyzer or of a pyramid synthesizer.

12 Claims, 6 Drawing Figures

SIGNAL PROCESSING SYSTEM

SIGNAL PROCESSING SYSTEM

FILTER LOGIC UNIT MODULE

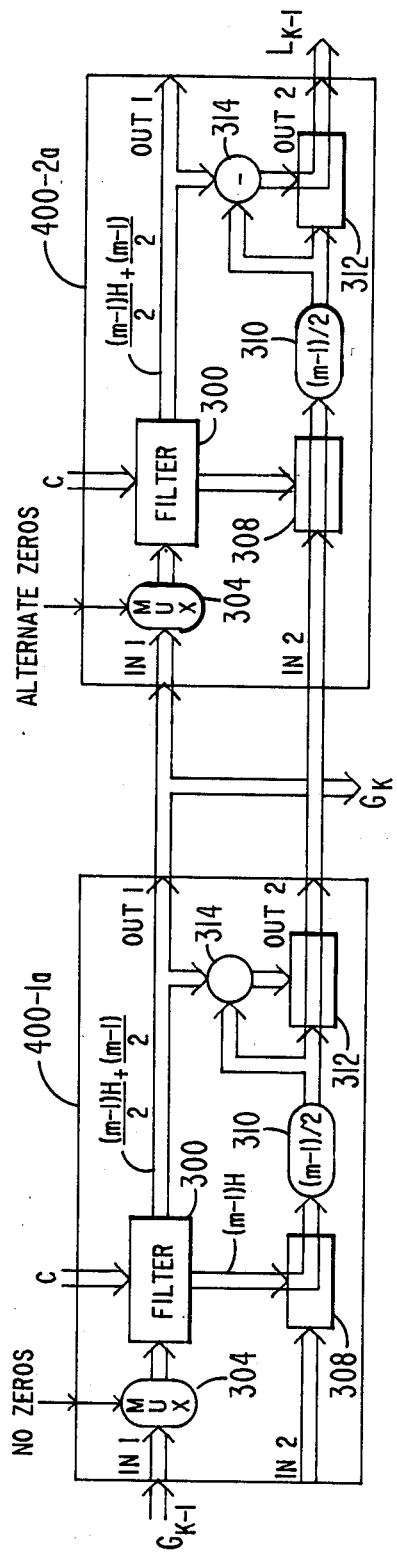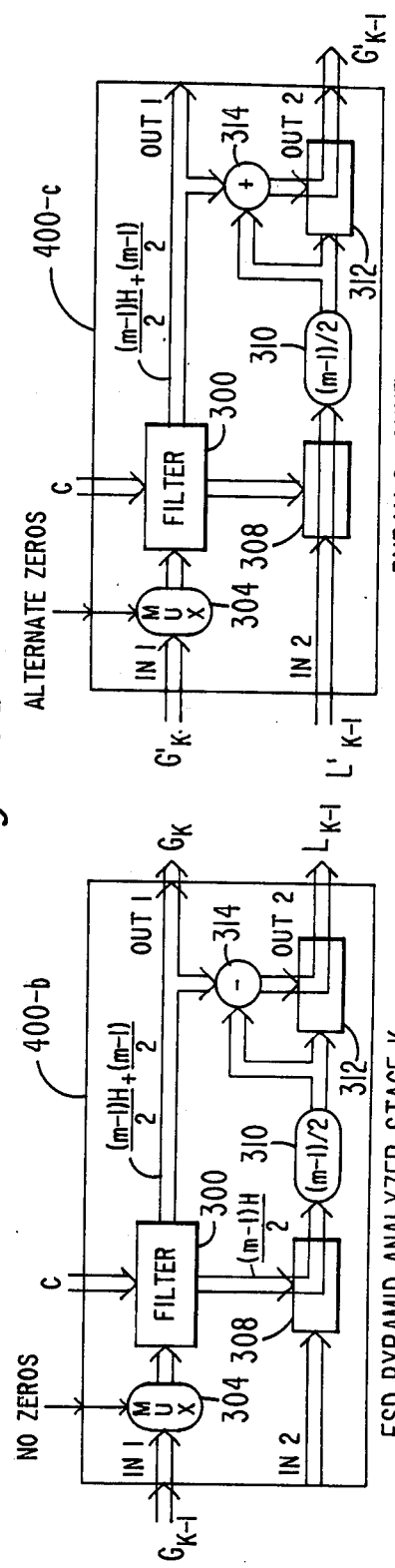
Fig. 4a — BURT PYRAMID ANALYZER STAGE K (2 MODULES)
Fig. 4b — FSD PYRAMID ANALYZER STAGE K
Fig. 4c — PYRAMID SYNTHESIZER STAGE K

PROGRAMMED IMPLEMENTATION OF REAL-TIME MULTIRESOLUTION SIGNAL PROCESSING APPARATUS

BACKGROUND OF THE INVENTION

1. Field of the Invention

This invention relates to real-time multiresolution signal processing apparatus, which is useful in performing hierarchial pyramid signal processing techniques for analyzing the frequency spectrum of an information component (having one or more dimensions) of a given temporal sampled signal having a highest frequency of interest no greater than $f_0$, and/or for synthesizing such a temporal signal from the analyzed frequency spectrum thereof.

2. Description of the Prior Art

Reference is made to co-pending U.S. patent application Ser. No. 596,817, entitled "Real-Time Hierarchical Pyramid Signal Processing Apparatus," filed Apr. 4, 1984, by Curtis R. Carlson, et al., issued June 16, 1987, as U.S. Pat. No. 4,674,125 and assigned to the same assignee as the present invention. This co-pending Carlson, et al. application discloses apparatus employing pipeline architecture for implementing a hierarchical pyramid capable of either analyzing in delayed real time the frequency spectrum of an information component (having one or more dimensions) of a given temporal signal, or synthesizing in delayed real time such a temporal signal from the analyzed frequency spectrum thereof. Such pipeline architecture is particularly suitable for image processing the two dimensional spatial frequencies of television images defined by a temporal video signal.

In accordance with each of different species of the invention disclosed in the aforesaid Carlson, et al. application, the real-time hierarchical pyramid signal processing apparatus operates, alternatively, as a Burt Pyramid analyzer, a Burt Pyramid synthesizer, or a filter-subtract-decimate (FSD) pyramid analyzer. The FSD species of the Carlson, et al. generic invention is not specifically the invention of Carlson, et al., but is the invention of Charles Hammond Anderson. For this reason, the aforesaid Carlson, et al. application specifically disclaims the FSD pyramid analyzer species of the Carlson, et al. generic invention.

Reference is further made to co-pending U.S. patent application Ser. No. 774,984, entitled "A Filter-Subtract-Decimate Hierarchical Pyramid Signal Analyzing And Synthesizing Technique," filed Sept. 11, 1985, by Charles H. Anderson, and assigned to the same assignee as the present invention. This co-pending Anderson application discloses and specifically claims the FSD pyramid analyzer species of the generic invention disclosed in the aforesaid co-pending Carlson, et al. application.

The implementation of the real-time pyramid analyzer disclosed in the aforesaid co-pending Carlson, et al. application, is comprised of N separate cascaded stages, where N is a given plural integer. Similarly, the implementation of the real-time pyramid synthesizer disclosed in the aforesaid co-pending Carlson, et al. application is comprised of N separate cascaded stages. Each of these stages employs a relatively large amount of digital hardware, particularly when the information component of the temporal signal is defined by more than one dimension (e.g., a video signal comprised of a serial stream of 8-bit pixel samples that define successive frame of a scanned two-dimensional television image). Thus, the total amount of hardware employed by the Carlson, et al. implementation tends to be quite large.

Reference is further made to co-pending U.S. patent application Ser. No. 768,809, entitled "Multiplexed Real-Time Pyramid Signal Processing System" filed Aug. 23, 1985, by Roger F. Bessler, et al., and assigned to the same assignee as the present invention. This co-pending Bessler, et al. application makes use of time multiplexing to greatly reduce the amount of hardware required to implement a real time pyramid signal processing system.

A first feature that both the real-time pyramid systems disclosed respectively in the aforesaid co-pending Carlson, et al. application and Bessler, et al. application have in common is that they are completely time synchronous. The expression "time synchronous," as used herein, means that in such a pyramid analyzer, there is a predetermined fixed set of respective delays between the occurence of each pixel sample of the input serial stream of pixel samples and the occurrence anywhere either in any of the analyzer stages or at the output of any of the analyzer stages of those respective pixel samples that correspond to that input pixel sample. Such complete time synchronous relationship is also true for the occurrence of all corresponding pixel samples of all the stages of the pyramid synthesizer. This means that all corresponding samples must move through the entire pyramid perfectly (i.e., without any timing errors) for proper operation, despite the long delay which occurs between the occurrence of an input pixel sample to such a pyramid analyzer and the occurence of its corresponding pixel sample of at least one of the analyzed subspectra outputs. This delay can amount to many tens of thousands of pixel sample periods. Further, because of the severe timing constraints on such a completely time-synchronous pyramid system, it is limited, for the most part, to a single predetermined mode of operation, so that a time-synchronous pyramid system cannot be programmed to any appreciable extent.

SUMMARY OF THE INVENTION

The present invention is directed to multiresolution processing apparatus (which may be programmed as pyramid processing apparatus) that is incorporated in a delayed real time signal processing system utilizing digital techniques for operating, during each of successive time cycles, on a series of temporal signal samples that define at least one block of an n-dimensional information component, where n is a given integer of at least one, and each of the time cycles is composed of a certain number of sample periods that is at least as large as the number of temporal signal samples in the series.

The multiresolution processing apparatus of the present invention is comprised of the combination of four elements. The first element is a programmable filter logic unit for deriving a set of one or more sampled-signal outputs therefrom as specified selectable functions of a set of one or more sampled-signal inputs thereto in accordance with the values of applied first digital control signals. The second element is a plurality of addressable read/write memory means each of which is separately addressable in each of the n dimensions, each of the memory means being controllable in accordance with the values of applied second digital control signals. The third element is programmable coupling means including a first set of multiplexers (MUX) individually associated with each of the filter logic unit outputs and a second set of MUX individually associated with each of the filter logic unit inputs for selectively coupling (1) any filter logic unit output as a write-input to a selected one of at least two of the memory means through that one of the first set of MUX individually associated with that filter logic unit output; (2) the read-output of any one of the at least two of the memory means to a selected one of the filter logic unit inputs through that one of the second set of MUX individually associated with that filter logic unit input; (3) any filter logic unit output directly to any selected one of the filter logic unit inputs through those respective ones of the first and second sets of MUX that are individually associated with that filter logic unit output and that selected one of the filter logic unit inputs; and/or (4) an applied external series of the temporal signal samples to any selected one of the filter logic unit inputs through that one of the second set of MUX individually associated with that selected one of the filter logic unit inputs—all in accordance with the values of applied third digital control signals. The fourth element is timing and control means for deriving and applying the respective first, second and third digital control signals, the timing and control means including addressable instruction memory means for determining the respective values of the first, second and third digital control signals during each one of the certain number of sample periods in each of the time cycles.

The present invention is particularly suitable for use in processing "reduced data" images in so-called "smart" television cameras. Such "smart" television cameras are useful in surveillance systems, robotic systems, etc., wherein the camera often cooperates with a computer. Such a computer generally requires that the camera image data be reduced, because it cannot handle the rate of data flow that is required to process all of the available camera data. However, the present invention can also be implemented so that it is able to handle all the non-reduced image data in a standard television video signal (e.g., an NTSC video signal).

BRIEF DESCRIPTION OF THE DRAWING

FIGS. 4a, 4b and 4c, respectively, illustrate three different functional arrangements of the filter logic unit of FIG. 2.

PREFERRED EMBODIMENTS

In the following description of the present invention, it will be assummed, for illustrative purposes, that the multiresolution processing apparatus of the present invention is incorporated in the particular signal processing system of FIG. 1, since this particular system has been built. However, it should be understood that this is not essential, and that the multiresolution processing apparatus of the present invention may be incorporated in other types of signal processing systems that differ in many ways from that that has been shown in FIG. 1 for illustrative purposes only.

Figure 1:
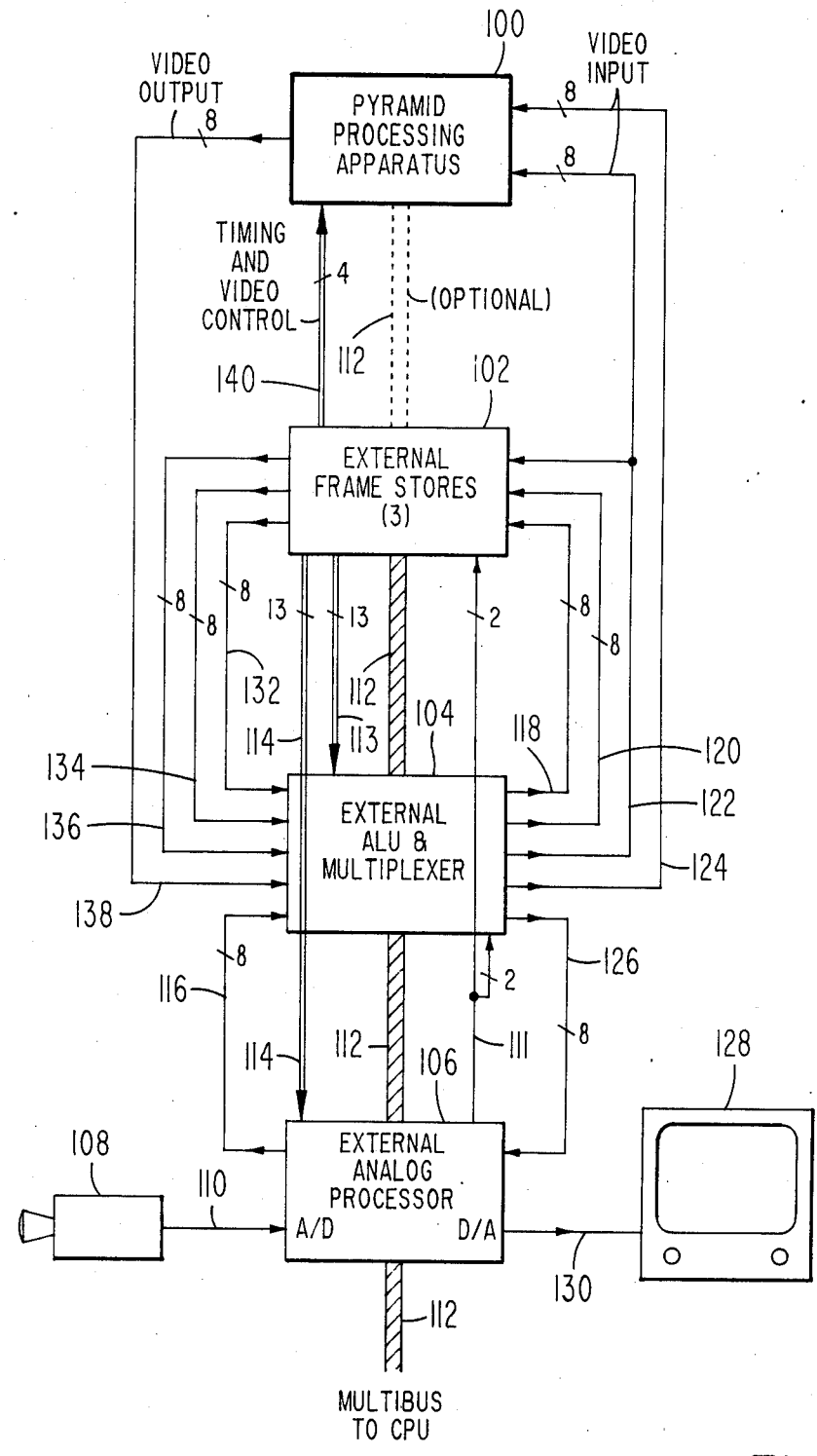
FIG. 1 is an illustrative embodiment of a signal processing system incorporating the pyramid processing apparatus of the present invention.

The system FIG. 1 is comprised of multiresolution processing apparatus (embodying the present invention) that is particularly suitable for implementing pyramid algorithms and, therefore, is designated pyramid processing apparatus 100. However, it should be understood that apparatus 100 is useful in performing other types of multiresolution processing, in addition to pyramid processing. The system of FIG. 1 further includes three external frame stores 102, external ALU (arithmetic logic unit) and multiplexer 104, and external analog processor 106. All of external elements 102, 104 and 106 of the signal processing system of FIG. 1 are comprised of commercially available equipment.

Analog processor 106 is responsive to an analog video signal (e.g., an NTSC video signal) from television camera 108 (or any other source of analog video signal) applied as an input thereto over connection 110. Analog processor 106 includes a 10 MHz clock signal generator and means for detecting the occurrence of each successive vertical reset signal (hereinafter referred to as $V_R$) included in the analog video signal supplied as an input to analog processor 106 over connection 110. The 10 MHz clock and $V_R$ signals are forwarded as control inputs to multiplexer 104 and the three frame stores 102 via connection 111. In addition, program control signals are forwarded over multibus 112 from a central processing unit (CPU)—or other programming source—to each of external elements 102, 104 and 106. As indicated in FIG. 1, pyramid processing apparatus 100 (which embodies the present invention) can optionally also receive program control signals over multibus 112.

Each of the three frame stores of element 102 includes a random access memory (RAM) capable of storing the respective values of all the pixel samples in a digitally-sampled image frame of the video signal. In addition, one of the frame stores 102 is a master frame store that includes timing and control means for deriving a plurality of timing and control signals (including a derived 5 MHz clock) in response to the 10 MHz and $V_R$ supplied thereto over connection 111 and the program control signals supplied thereto over multibus 112. The other two frame stores of element 102 are slaves which are controlled by timing and control signals from the master frame store (although they also receive $V_R$ and 10 MHz clocks over connection 111).

The master frame store supplies timing and control signals (including the derived 5 MHz clock) to multiplexer 104 over connection 113 and supplies timing and control signals to analog processor 106 over connection 114.

Analog processor 106 further includes an analog-to-digital (A/D) converter for sampling the analog video signal supplied thereto over connection 110 at a 10 MHz pixel clock frequency and representing each level value of each pixel sample as an 8-bit binary number. The resulting digital video signal from the A/D processor 106 is applied over connection 116 as a particular one of several digital video signal inputs to multiplexer 104. The 10 MHz sampled video signal from analog processor 106 is sub-sampled at 5 MHz by the ALU of element 104. Multiplexer 104, in accordance with program control information supplied thereto over multibus 112, can selectively intercouple any of its plurality of video outputs to any of its plurality of video inputs, with an intercoupled video input being forwarded to its selected video output either directly or after processing by the ALU of element 104. The particular processing by the ALU is also determined by the program control information applied over multibus 112.

More specifically, the video signal supplied to multiplexer 104 over connection 116 may be selectively forwarded over connection 118 to a first of the three frame stores 102; over connection 120 to a second of the three frame stores 102; over connection 122 to both the third of the three frame stores 102 and as a first of two video inputs to pyramid processing apparatus 100; over connection 124 as a second of two video inputs to pyramid processing apparatus 100; and over connection 126 as an input to processor 106. Processor 106 includes a digital-to-analog (D/A) converter for converting the digital video input supplied thereto over connection 126 into a video analog output therefrom that is supplied to a television monitor 128 (or any other type of video signal utilization device) over connection 130.

Further, a video signal read out of the first of the three frame stores 102 is applied as a video input to multiplexer 104 over connection 132; a video signal read out of the second of the three frame stores 102 is applied as a video input to multiplexer 104 over connection 134; a video signal read out of the third of the three frame stores 102 is applied as an input to multiplexer 104 over connection 136; and a video output from pyramid processing apparatus 100 is applied as a video input to multiplexer 104 over connection 138.

In addition, the master frame store 102 that includes the timing and control means supplies timing and video control signals to pyramid processing apparatus 100 over connection 140.

Figure 2:
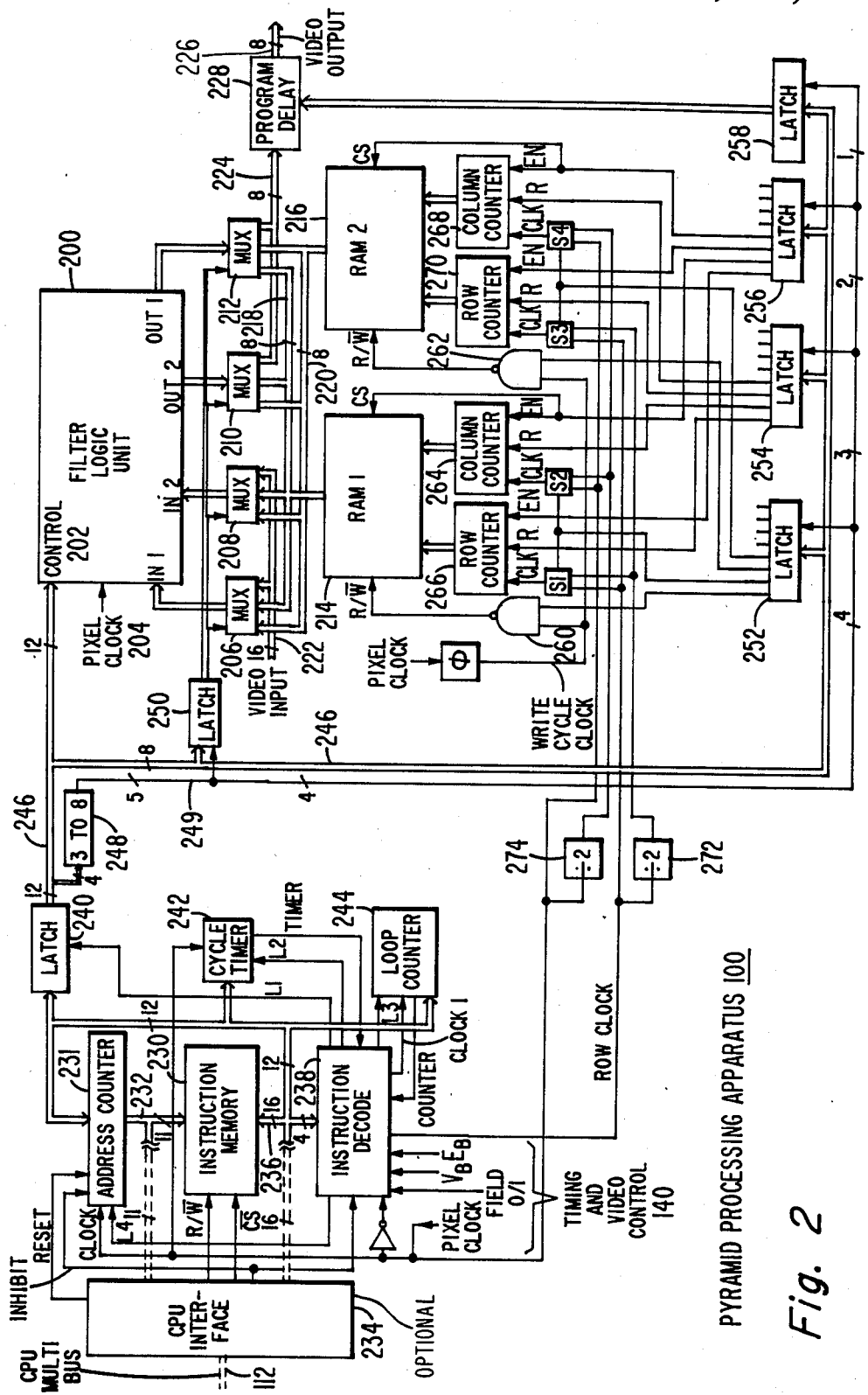
FIG. 2 is a block diagram of a preferred embodiment of the pyramid processing apparatus of the present invention.

A block diagram of a preferred embodiment of pyramid processing apparatus 100, which incorporates the present invention, is shown in FIG. 2. As indicated in FIG. 2, the timing and video control signals supplied to pyramid processing apparatus over connection 140 are comprised of the 5 MHz pixel clock, a field 0/1 control signal (indicative of whether the current field of an interlaced NTSC video signal is the first field of an interlaced television frame or is the second field of an interlaced television frame), the vertical blanking signal $V_B$ and a so-called E blanking signal $E_B$ (which is a phase displaced horizontal sync signal that occurs, at the horizontal scan line frequency of the video signal, a fixed predetermined time before the occurrence of the horizontal sync signal included in the video signal).

Pyramid processing apparatus 100 can be considered to be comprised of four major components. The first of these four major components is filter logic unit 200. Filter logic unit 200 is comprised of one or more filter logic unit modules having the structure shown in FIG. 3 (discussed in detail below). As indicated in FIG. 2, filter logic unit 200 includes a control input 202, a pixel clock input 204, a first video input IN 1, a second video input IN 2, a first video output OUT 1, and a second video output OUT 2. The second major component of pyramid processing apparatus 100 is comprised of a set of four respective multiplexers (MUX) 206, 208, 210 and 212. As indicated, each of the respective MUX 206, 208, 210 and 212 is individually associated with a different one of the video inputs or video outputs of filter logic unit 200. Specifically, the output from MUX 206 is applied as the first video input IN 1, the output from MUX 208 is applied as the second video input IN 2, the second video output OUT 2 is applied as an input to MUX 210, and the first video output OUT 1 is applied as a input to MUX 212.

The third major component of pyramid processing apparatus 100 is comprised of a first random-access-memory (RAM 1) 214 and a second random-access-memory (RAM 2) 216, which is used to provide temporary storage of video signals that occur during pyramid processing. As indicated, first RAM 1 (214) can receive its write input from either MUX 210 or MUX 212, or may supply its read output to either MUX 206 or MUX 208 over video-signal bus 218. Second RAM 2 (216) has its write input applied thereto either from MUX 210 or MUX 212 and has its read output supplied to either MUX 206 or MUX 208 over video signal bus 220. As indicated in FIG. 2, each of buses 218 and 220 is an 8-bit bus, which is capable of handling only one 8-bit digital video signal at a time. Bus 222, which is a 16-bit bus, is capable of applying either of the two 8-bit digital video signal inputs to pyramid processing apparatus 100 (see FIG. 1) as an input to either MUX 206 or MUX 208. Thus, if a first of the two 8-bit video inputs to pyramid processing apparatus 100 is applied as an input to MUX 206, the other of the two video inputs may or may not be simultaneously applied as an input to MUX 208. Similarly, if the second of the two 8-bit video signal inputs to pyramid processing apparatus is applied as an input to MUX 206, the first of these two video inputs may or may not be simultaneously applied as an input to MUX 208. An 8-bit video bus 224 is capable of applying at one time either the video output from MUX 210 or, alternatively, the video output form MUX 212 to the 8-bit video output bus 226 of pyramid processing apparatus 100 (see FIG. 1) through programmable delay means 228 of FIG. 2.

The fourth major component of pyramid processing apparatus 100 (which comprises the remainder of FIG. 2 block diagram) is a timing and control unit for programming the operation of each of the first three major units (discussed above) of the pyramid processing apparatus 100 to perform a desired pyramid processing function during each of successive pixel sample periods.

The timing and control unit of pyramid processing apparatus 100 is comprised of instruction memory 230, which is addressable in accordance with the output from address counter 231, and which is applied as an input to instruction memory 230 over 11-bit address bus 232. Alternatively, instruction memory 230 may be either a random-access-memory (RAM) or may be a programmable read-only-memory (PROM). Address counter 231 is a 12-bit counter (count capacity is $2^{12}$), but only the lower 11-bit address is utilized.

In the case in which instruction memory 230 is a RAM, a set of instructions from the CPU may be loaded into instruction memory 230 over multibus 112 (FIG. 1) through CPU interface 234. The CPU interface 234 decodes and arranges the information supplied thereto over multibus 112, thereby deriving appropriate control signals, address signals and instruction data signals for the instruction memory RAM 230. The control signals include a reset signal applied as an input to address counter 231, a read-write (R/$\overline{\text{W}}$) signal, a chip select ($\overline{\text{CS}}$) signal applied as an input to instruction memory 230, and an inhibit signal applied as an input to both address counter 231 and instruction decode means 238. The address information from CPU interface 234 is applied to instruction memory 230 over 11-bit address bus 232 and the $\overline{\text{CS}}$ connection, the instruction codes themselves are applied from CPU interface 234 to instruction memory 230 over 16-bit data bus 236. In this manner, an instruction memory 230, in the form of a RAM, can be loaded with a set of appropriate instructions codes, each instruction code being situated at an appropriate address.

If instruction memory 230 is a PROM, rather than a RAM, there is no need for CPU interface 234, including the respective outputs therefrom, because a PROM is used as a fixed store of instructions. It is for this reason that, CPU interface 234 is indicated as being "optional" in FIG. 2. However, in case of a PROM, it is possible that initializing circuitry (not shown) may be employed for inserting an initial address in address counter 231, or the initial address could select one out of several programs stored in the PROM.

Cooperating with instruction memory 230 and address counter 231 are instruction decode means 238, latch 240, cycle timer 242 and loop counter 244. More specifically, 4-bits of 16-bit data bus 236 are applied to instruction decode means 238, and at most 12-bits of 16-bit data bus 236 are applied to each of address counter 231, latch 240, cycle timer 242 and loop counter 244. Specifically, address counter 231 may be jam loaded with a new 12-bit address over data bus 236.

Instruction decode means 238 is also supplied with the three video control and timing signals field 0/1, $V_B$ and $E_B$, while the pixel clock video control and timing signal is applied either directly or in inverted form to address counter 231, instruction decode means 238 and cycle timer 242.

The manner in which instruction memory 230, address counter 231, instruction decode means 238, latch 240, cycle timer 242 and loop counter 244 cooperate with one another will now be described. The upper 4-bits of 16-bit instruction code read out of instruction memory 230 is applied to instruction decode means 238. These 4-bits specify 16 different possible classes. The sequence of the instruction codes read out of instruction memory 230 during each successive pixel clock period is specified by address counter 231 (which is roughly equivalent to a microprocessor program counter). Address counter 231 usually increments by one count during each instruction cycle (pixel clock period), advancing successively to read out instructions in serial order. However, address counter 231 may be caused to jump to a specified new address by jam loading the new address, equal to the lower 12-bits of the instruction code, into address counter 231.

Image processing is a dynamic activity, with instructions and other data constantly moving from one pixel clock cycle to the next pixel clock cycle. However, occasions arise when it becomes expedient to wait for some reason (e.g., to wait until some expected event occurs). For these occasions, cycle timer 242 is included. Cycle timer 242 is a counter which can be jam loaded with the lower 8-bits of an instruction. The cycle timer counter increments one count with each pixel clock cycle, eventually timing out when count 256 is registered. When cycle timer 242 times out, it applies a flag signal to instruction decode means 238 over the "timer" output from loop counter 244, thereby selectively affecting the operation performed by instruction decode means 238 in response to the flag signal in a manner which depends also on the particular instruction then being read out of instruction memory 230.

A useful control for image processing is loop counter 244, which keeps a record of when some event occurs. Loop counter 244, which can be jam loaded by the lower 8-bits of an instruction, is incremented by a "clock one" pulse input thereto from instruction decode means 238 (rather than by the pixel clock). A "clock one" pulse occurs only in response to one or more specified instructions being decoded by instruction decode means 238. When loop counter 244 times out (by registering count 256), it applies a flag signal to instruction decode means 238 over the "counter" output from loop counter 244, thereby affecting the operation performed by instruction decode means 238 in response to the flag signal.

The jam loading of latch 240, cycle timer 242, loop counter 244 and address counter 231 is controlled by the L1, L2, L3 and L4 outputs from instruction decode means 238. More specifically, the lower 12-bits then present on data bus 236 are jam loaded into latch 240 in response to the occurrence of the L1 output from instruction decode means 238 and are jam loaded into address counter 231 in response to the occurrence of output L4 from instruction decode means 238. The lower 8-bits then present on data bus 236 are jam loaded into cycle timer 242 in response to the presence of the L2 output from instruction decode means 238 and are jam loaded into loop counter 244 in response to the occurrence of output L3 from instruction decode means 238.

The 12 bits emerging from latch 240 on bus 246 are comprised of 4 address bits and 8 data bits. All 12 bits on bus 246 are applied to control input 202 of filter logic unit 200. In addition, the 4 address bits on bus 246 are applied as an input to "3 to 8" decoder 248. One of these 4 bits is used to control the enabling of decoder 248, while the remaining 3 address bits are decoded into 8 possible enabling control signals. However, only 5 of the 8 possible enabling control signals are actually used. Specifically, individual ones of the 5 used enabling control signal outputs from decoder 248 on bus 249 are applied respectively to latches 250, 252, 254, 256 and 258. The 8 data bits on bus 246 are applied to all of the latches 250, 252, 254, 256 and 258. In response to any one of these latches 250, 252, 254, 256 and 258 being enabled, the 8-bit data then present on data bus 246 is registered therein. The data registered in latch 250 is used to control the selective operation of one or more of the set of 4 MUX 206, 208, 210 and 212. The data in latch 252 is used to selectively enable NAND gates 260 and 262, switches S1 and S2, and switches S3 and S4. The data in latch 254 is used to selectively reset first RAM column counter 264 and row counter 266, and reset second RAM column counter 268 and row counter 270. The data registered in latch 256 is used to selectively enable first RAM 214 together with its column and row counters 264 and 266, and second RAM 216 together with, its column and row counters 268 and 270. The data that is registered in latch 258 is used to selectively program the amount of delay inserted by programmable delay 228.

Column and row counters 264 and 266 are used to address first RAM 214 and column and row counters 268 and 270 are used to address second RAM 216.

Instruction decode means 238 supplies a row clock at a row clock frequency determined by the set of instructions. This row clock frequency may be at the video signal scan-line frequency or at some other frequency depending on the programming (although the former is assumed for purposes of discussion). The row clock frequency is reduced in half by "÷2" 272. Similarly, a pixel clock has its frequency reduced in half by "÷2" 274. Depending on the state of switches S1 and S3, the row clock, either at its original frequency or at its half-frequency, is applied as the clock input to row counters 266 and 270. Similarly, depending on the state of switches S2 and S4, the pixel clock, either at its original frequency or at its half-frequency is applied as the clock input to column counters 264 and 268. A write cycle clock (comprised of the pixel clock delayed in phase by phase delay means 274) is applied to the R/$\overline{W}$ input of first RAM 214 when NAND gate 260 is enabled and is applied to the R/$\overline{W}$ input of second RAM 216 when NAND gate 262 is enabled.

Figure 3:
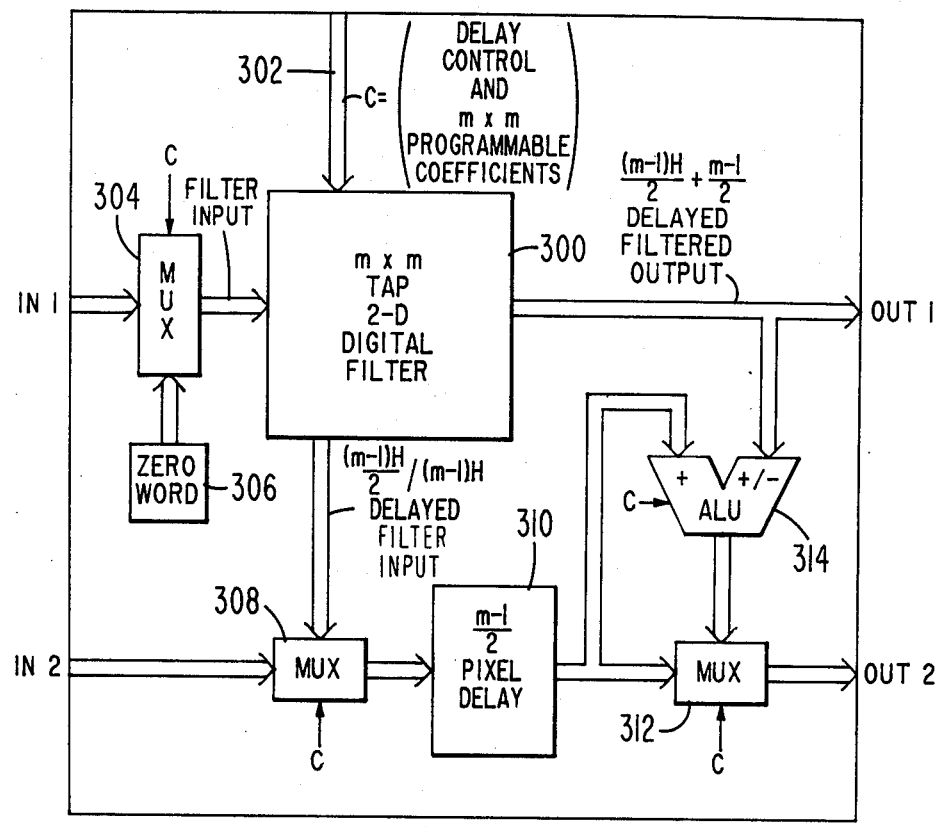
FIG. 3 is a block diagram of a filter logic unit module, one or more of which comprises the filter logic unit of FIG. 2.

FIG. 3 is a block diagram showing the structure of a filter logic unit module in somewhat simplified form. Although not structurally shown in FIG. 3, the 4 address bits and 8 data bits applied to control input 202 of filter logic unit 200 are appropriately decoded and registered in latches (not shown) present in the filter logic unit module. Further, the filter logic unit that was built included other programmable means, including look-up tables in the form of addressable read-only memory (ROM) and programmable pipeline registers. In any case, a plurality of control signals (designated C in FIG. 3) are derived. These control signals include control signals applied as an input to an m×m tap 2-D digital filter 300 (where m is a plural integer, preferably having a value of at least 5). The 2-D digital filter that was used in the pyramid processor that was built was a separable filter consisting of an output-weighted vertical filter followed by an input-weighted horizontal digital filter. As indicated in FIG. 3, the control signals C that are applied to digital filter 300 over bus 302 are used to provide delay control and to provide m×m programmable coefficients for the kernel weighting function of the vertical and the horizontal component filters of the 2-D digital filter 300.

The video input to IN 1 of the filter logic unit module is supplied as one input to MUX 304 and the output of "zero word" generator 306 is applied as a second input to MUX 304. The control signal C applied to MUX 304 determines which of the first and second inputs thereto is forwarded to the output of MUX 304 and constitutes the filter input to digital filter 300.

As is known, an output-weighted vertical digital filter includes programmable-length delay means (e.g., a shift register) for delaying the filter input pixel stream by a selected amount. For purposes of discussion it is assumed that this selected amount is at least (m−1) horizontal scan line intervals H, in order that the corresponding vertically-arranged pixels in m successive scan lines are available in time coincidence with one another, prior to being multiplied by the respective m coefficients of the kernel weighting function of the vertical filter and, thereafter, summed (a block diagram of the structure of such an output-weighted digital vertical filter is shown in the aforesaid copending Carlson, et al. application). The present invention takes advantage of the already-present delay means in the vertical filter portion of 2-D digital filter 300 to delay the filter-input pixel stream to filter 300 by a selectable predetermined number of horizontal scan line periods H. Although employing the delay means of the vertical filter portion of 2-d digital filter 300 to provide a delayed filter input saves hardware (and is therefore desirable), the delayed filter input may, alternatively, be derived by a delay means which is not part of 2-D digital filter 300.

The kernel weighting functions employed in the low-pass filters used to implement the Burt Pyramid and the FSD pyramid disclosed in the aforesaid copending Carlson, et al. application are spatially localized and symmetrical. Also, the relative values of the kernel weighting function coefficients are selected to provide so-called "equal contribution." For this reason, the number of taps m in each dimension is virtually always odd (e.g., 5). Specifically, the delay interval provided by the delayed filter input is selectable in accordance with a delay control signal between a first value (m−1)H/2 and a second value (m−1)H. Therefore, assumming m to be equal to 5, the delay interval is either two horizontal scan line periods or four horizontal scan line intervals, in accordance with the programming of the delay control signal applied to digital filter 300.

MUX 308 has the second video input signal IN 2 applied as a first input thereto and has the delayed filter input derived from digital filter 300 applied as a second input thereto. In accordance with the programmed value of the control signal applied to MUX 308, either the first input or the second input to MUX 308 is forwarded to the output thereof. The output from MUX 308 is delayed by (m−1)/2 pixel periods by delay means 310 and then applied both as a first input to MUX 312 and as a first input to ALU 314. The filtered ouput from digital filter 300 is applied both as a second input to ALU 314 and to the OUT 1 terminal of the filter logic unit module shown in FIG. 3. As indicated in FIG. 3, the m×m tap 2-D digital filter 300 ideally inserts a delay equal to (m−1)H/2+(m−1)/2 between corresponding pixels of the filtered output stream and the filter input stream. (In practice, this delay may be slightly longer due to the pipelining of the separable vertical and horizontal filters.) Thus, assumming m to be 5, the ideal delay is equal to two horizontal scan line periods plus 2 pixel periods. The output of ALU 314 is applied as a second input to MUX 312.

In accordance with the programmed value of the control signal applied to ALU 314, ALU 314 operates as a summer to provide at its output a pixel value which is equal to the sum of the respective pixel values applied in time coincidence to its first and second inputs, or, alternatively, operates as a subtractor to provide at its output a pixel value which is equal to the pixel value applied to its second input subtracted from the pixel value applied to its first input in time coincidence therewith. MUX 312, in accordance with the programmed value of the control signal applied thereto, forwards either its first input or its second input to OUT 2 of the filter logic unit module shown in FIG. 3.

FIGS. 4a, 4b and 4c, respectively, show how the filter logic unit 200 (comprised of one or two FIG. 3 filter logic unit modules) can be programmed to operate as a Burt Pyramid analyzer stage, an FSD pyramid analyzer stage, or a pyramid synthesizer stage. The terminology employed in the input and output signal designations employed in FIGS. 4a, 4b and 4c conform to those employed in the aforesaid copending Carlson, et al. application. More specifically, as disclosed in the aforesaid copending Carlson, et al. application, a Burt Pyramid analyzer, an FSD pyramid analyzer or a pyramid synthesizer, as the case may be, is comprised of N stages, where N is a plural integer. The Gaussian input signal to stage K (where K has a value between 1 and N) of a Burt or FSD pyramid analyzer stage is designated $G_{K-1}$; The output Gaussian signal from stage K of a Burt or FSD pyramid analyzer stage is designated $G_K$, and the Laplacian output signal from stage K of a Burt or FSD pyramid analyzer stage is designated $L_{K-1}$. The Gaussian input signal to stage K of a pyramid synthesizer is designated $G'_K$; the Laplacian input signal to stage K of a pyramid synthesizer is designated $L'_{K-1}$, and the Gaussian output signal from stage K of a pyramid synthesizer is designated $G'_{K-1}$. Each of respective input signals $G_{K-1}$, $G'_K$ and $L'_{K-1}$ in FIGS. 4a, 4b and 4c constitutes an input signal to the filter logic unit 200 of FIG. 2, while each of the respective output signals $G_K$, $L_{K-1}$ and $G'_{K-1}$ of FIGS. 4a, 4b and 4c constitute an output signal from the filter logic unit 200 of FIG. 2.

As indicated in FIG. 4a, a Burt Pyramid analyzer stage K is comprised of the two FIG. 3 filter logic unit modules 400-1a and 400-2a. The $G_{K-1}$ input signal is applied to IN 1 of module 400-1a. The $G_K$ output signal, which is derived at output OUT 1 of module 400-1a, is also forwarded directly as an input to IN 1 of module 400-2a. The output at OUT 2 of module 400-1a is forwarded directly as an input to IN 2 of module 400-2a. The $L_{K-1}$ output is derived at OUT 2 of module 400-2a.

As indicated in FIG. 4a, the respective elements 300, 304, 308, 312 and 314 of each of modules 400-1a and 400-2a are programmed differently from one another. In the case of module 400-1a, MUX 304 is programmed to forward each and every $G_K$ pixel applied to its first input to the filter input of filter 300. In the case of module 400-2a, MUX 304 is programmed to alternately switch between its first and second inputs, thereby forwarding only every other one of the $G_K$ pixels applied to its first input to the filter input of filter 300, while substituting at the filter input of filter 300 zero-valued pixels for alternate ones of the $G_K$ pixels, MUX 308 of module 400-1a is programmed to forward the delayed filter input to its delay means 310, while MUX 308 of module 400-2a is programmed to forward its IN 2 input to its delay means 310. The delay control of filter 300 of module 400-1a is programmed to provide a delay of (m−1)H (4 horizontal scan lined periods in the assumed example), while the programming of the delay control of filter 300 of module 400-2a is immaterial because the delayed filter input is not utilized in module 400-2a. MUX 312 of module 400-1a is programmed to forward the output of its delay means 310 to OUT 2 thereof, while MUX 312 of module 400-2a is programmed to forward the output of its ALU 314 to OUT 2 thereof. The programming of the ALU 314 of module 400-1a is immaterial because it is not utilized in module 400-1a. However, ALU 314 of module 400-2a is programmed to operate as a subtractor (i.e., the value of each $L_{K-1}$ pixel derived from OUT 2 of module 400-2a is equal to the value of each pixel from the filter output of filter 300 of module 400-2a applied to the second input of the ALU 314 of module 400-2a subtracted from the corresponding pixel in time coincidence therewith applied to the first input of ALU 314 of module 400-2a).

With one exception, the Burt Pyramid analyzer stage K shown in FIG. 4a performs all the functions performed by each stage of the Burt Pyramid analyzer shown and disclosed in the aforesaid copending Carlson, et al. application. More specifically, filter 300 of module 400-1a operates as the convolution filter of the Burt Pyramid analyzer stage K, MUX 304 and filter 300 of module 400-2a together operate as the expansion and interpolation filter of Burt Pyramid analyzer stage K, the delayed input of filter 300 of module 400-1a together with delay means 310 of both modules 400-1a and 400-2a operate as the delay means of Burt Pyramid analyzer stage K, and the ALU 314 of module 400-2a operates as the subtraction means of Burt Pyramid analyzer stage K. However, the Burt Pyramid analyzer stage shown in FIG. 4a does not include decimation means for sub-sampling the convolved filter output from filter 300 of module 400-1a (that constitutes the $G_K$ signal at OUT 1 of module 400-1a). However, as is discussed in more detail below, this $G_K$ signal is decimated at a later point in FIG. 2, that is situated outside of filter logic unit 200. On the other hand, the output from MUX 304 of module 400-2a, which is applied as an input to interpolation filter 300 of module unit 400-2a, is, in effect, decimated at the same time it is being expanded by the substitution of zero-valued pixels for alternate ones of the pixels of the $G_K$ signal applied as a first input to MUX 304 of module 400-2a.

Further, the total delay provided by delay input of filter 300 of module 400-1a, delay means 310 of module 400-1a and delay means 310 of module 400-2a is (m−1)H+(m−1)—four horizontal scan line periods plus four pixel periods in the assumed case. This is just equal to the total delay inserted by filter 300 of module 400-1a and filter 300 of module 400-2a, which ensures that corresponding pixels applied to the first and second inputs of ALU 314 of module 400-2a always occur in time coincidence with one another.

The FSD pyramid analyzer stage case shown in FIG. 4b requires only a single module 400-b. Respective MUX 304 and 308 of module 400-b are programmed in an identical manner to that of respective MUX 304 and 308 of module 400-1a and ALU 314 of module 400-b is programmed in an identical manner to ALU 314 of module 400-2a. However, the delay control of filter 300 is programmed to provide a delay for the delayed input of (m−1)H/2. Thus, the total delay provided by the delayed input and delay means 310 is (m−1)H/2+(m−1)/2 —two horizontal scan line periods plus two pixel periods in the assumed case. This total delay (which is just equal to the delay inserted by filter 300) ensures that corresponding pixels applied to the first and second inputs of ALU 314 of module 400-b.

The pyramid synthesizer stage K shown in FIG. 4c is comprised of only a single module 400-c. The corresponding pixels of the two inputs $G'_K$ and $L'_{K-1}$ applied to the respective inputs IN 1 and IN 2 of module 400-c do not occur in time coincidence with one another, but are time skewed with respect to one another. More specifically, each $L'_{K-1}$ pixel is delayed with respect to its corresponding $G'_K$ pixel by an amount equal to (m−1)H/2 (two horizontal scan line periods in the assumed case). However, this time skewing does not take place in module 400-c, but takes place at some other point in the signal processing system (as will be discussed below).

Respective MUX 304, 308 and 312 of module 400-c are programmed in a manner identical to respective MUX 304, 308 and 312 of module 400-2a, described above. Because the delayed input from filter 300 is not employed in module 400-c, it is immaterial as to how the delay control is programmed. However, ALU 314 of module 400-c is programmed to operate as a summer, rather than as a subtractor.

As a first example of the operation of the pyramid processor shown in FIG. 2, it is assumed that filter logic unit 200 is comprised of the single filter logic unit module 400-b (FIG. 4b) programmed to operate as an FSD pyramid analyzer stage. Further, it is assumed that the video input signal to pyramid processing apparatus 100 is an 8-bit digital video signal that represents only the first of the two interlaced fields of each successive frame of an NTSC analog video signal applied by television camera 108 and applied over connection 110 as an input to external analog processor 106 (shown in FIG. 1). For image-processing purposes in surveillance and robotics systems, the lower image resolution that results from using only one of the two interlaced fields of each successive frames is usually sufficient. A further benefit, when such lower resolution images are sufficient, is that it is not necessary to convert each interlaced-scanned frame of the video signal to a progressive scan format prior to processing by pyramid processing apparatus 100. This saving in hardware lowers the complexity and cost of such systems.

In accordance with the foregoing assumptions, it is plain that the video input does not consist of a continuous stream of pixel samples. Instead, the series of pixel samples that occur during the first field period (1/60 sec.), of each successive frame of the video signal constitutes a block of image information. Successive blocks of image information are separated from one another by void intervals that occur during each second field period (1/60 sec.) of each successive frame of the video signal applied as a video input to pyramid processing apparatus 100. However, pyramid processing apparatus 100 continually processes this video input image information during both the first and second field periods of each successive frame of the video signal.

Specifically, MUX 206, 208, 210 and 212 and first and second RAMs 214 and 216 are programmed to operate in the following manner.

During the first field of each successive frame, a series of pixel samples that define the block of image information of that frame are applied as the video input to MUX 206, which forwards a series of pixel samples to the IN 1 input of filter logic unit 200. At this time, filter logic unit 200 operates as the first stage of the pyramid and the series of pixel samples then applied to IN 1 of filter logic unit 200 constitute the $G_0$ input to the pyramid. This results in $G_1$ being derived at OUT 1 and $L_0$ being derived at OUT 2 of filter logic unit 200 (FIG. 4b configuration).

MUX 210 forwards $L_0$ from OUT 2 through programmable delay 228 to the video output 226 from pyramid processing apparatus 100 (where it may be further processed by the signal processing system of FIG. 1, as will be discussed below). The series of $G_1$ pixel samples at OUT 1 (which have as yet not been decimated) are forwarded through MUX 212 as a write input to first RAM 214. However, the column counter 264 and row counter 266 are incremented by clock signals derived respectively from "÷2" 274 and "÷2" 272 (i.e., column counter 264 is incremented at half the pixel clock frequency and row counter 266 is incremented at half the row clock frequency). This results in only every other one of the $G_1$ samples in every other one of the horizontal scan lines of the image being stored in first RAM 214 (thereby providing the necessary decimation in both the horizontal and vertical image dimensions). Therefore, only one-fourth of all the $G_1$ samples appearing at OUT 1 filter logic unit 200 are stored in first RAM 214. This process continues until the end of the first field period of each successive image frame of the video signal. At the beginning of the second field period of each successive image frame, column counter 264 and row counter 266 are respectively clocked at full pixel clock frequency and full row clock frequency to thereby serially read out all of the stored $G_1$ samples from first RAM 214 in only the first quarter of that second field period. MUX 206 is then programmed to forward these read out $G_1$ pixel samples from first RAM 214 to the IN 1 input of the filter logic unit 200. This results in $G_2$ samples appearing at OUT 1 and $L_1$ samples appearing at OUT 2 of filter logic unit 200.

MUX 210, operated in the same manner as described above in connection with the $L_0$ signal, forwards the $L_1$ signal through programmable delay 228 to video output 226. However, this time, MUX 212 is programmed to forward the $G_2$ pixel samples from OUT 1 as a write input to second RAM 216 (rather than first RAM 214). Second RAM 216 is operated during its respective write and read cycles in a manner similar to that described above in connection with first RAM 214. Therefore, horizontally and vertically decimated $G_2$ samples (equal in number to only one-sixteenth the number of $G_0$ samples) are first stored, and then the stored $G_2$ samples are read out in one sixteenth of the second field period and forwarded through MUX 206 to IN 1 of filter logic unit 200.

This process continues for each of the successive stages of the pyramid, with each of first and second RAMS 214 and 216 alternately being used to decimate and then store the Gaussian output pixel samples forwarded thereto from OUT 1 of filter logic unit 200 through MUX 212.

As discussed in detail in the aforesaid copending Carlson et al. application, the analyzed signal from an N stage pyramid analyzer is comprised of $L_0, L_1 \ldots L_{N-1}$ and $G_N$. As so far described, the pyramid processing apparatus 100 will sequentially forward each of the Laplacian analyzed subspectra signals $L_0, L_1 \ldots L_{N-1}$ to the video output 226 of pyramid processing apparatus 100. At the same time that $L_{N-1}$ is being forwarded from OUT 2 of filter logic unit 200 through MUX 210 and programmable delay 228 to video output 226, the remnant subspectrum signal $G_N$ is being forwarded from OUT 1 of filter logic unit 200 through MUX 212 for storage in decimated form in one of the two RAMS 214 and 216. It is now necessary to read out the stored decimated $G_N$ pixel samples and forward them, without further processing, to video output 226. To accomplish this, somewhat different programming than that which has been described is necessary.

Specifically, MUX 308 and 312 of the filter logic unit module 400 b are now programmed to couple their respective outputs to their respective first inputs (thereby extending a path from IN 2 to OUT 2 of filter logic unit 200 through pixel delay means 310. Further, MUX 208 is programmed to forward the readout decimated $G_N$ pixel samples to IN 2 of filter logic unit 200 and MUX 210 is programmed to forward OUT 2 to video output 226 through programmable delay 228. In this manner, the decimated remnant signal $G_N$ reaches video output 226 of pyramid processing apparatus 100.

In general, the operation of a signal processing system (e.g., the signal processing system shown in FIG. 1) in which pyramid processing apparatus 100 is employed is not part of the present invention. However, in most cases, the pyramid analyzed video output from pyramid processing apparatus 100, consisting of $L_0, L_1 \ldots L_{N-1}$, and $G_N$ (appearing on connection 138 in FIG. 1) is usually forwarded through element 104 to a selected one of frame stores 102 for storage therein (either in its original form or after alteration or modification by the ALU of element 104). The fact that pyramid analyzed signal $L_0, L_1 \ldots L_{N-1}$ and $G_0$ are stored, permits pyramid processing apparatus 100 to later operate as a pyramid synthesizer to reconstruct a $G'_0$ signal.

Other than the fact that filter logic unit 200 is comprised of the two modules 400-1a and 400-2a of FIG. 4a (rather than the single module 400-b of FIG. 4b), the operation of pyramid processing apparatus 100 performing a Burt Pyramid analysis is identical in all material respects to that described above in connection with an FSD pyramid analysis.

A second example of the operation of pyramid processing apparatus 100 is the use of a filter logic unit 200 having the configuration shown in single module 400-c FIG. 4c to perform an N stage pyramid synthesis. In this case, it is assumed that the analyzed signals $G'_N$, $L'_{N-1}$ . . . L1, and $L_0$ are stored in one of the three external frame stores 102 of FIG. 1. The process begins with the remnant signal $G'_N$ being transferred from storage in one of the external frame stores 102 to first RAM 214 of the pyramid processing apparatus 100. This is accomplished by forwarding the $G'_N$ remnant signal pixel samples through multiplexer 104 and applying them as one of the 8-bit inputs to pyramid processing apparatus 100 over connection 122 or 124 (as shown in FIG. 1). At the same time, MUX 312 and module 400-c of filter logic unit 200 is temporarily programmed to couple its first input to its output (thereby extending a direct path between IN 2 and OUT 2 through pixel delay means 310), while MUX 208 is programmed to forward the $G'_N$ video input to IN 2 and MUX 210 is programmed to forward $G'_N$ remnant signal reaching OUT 2 as a write input to RAM 214 at full column and row clock frequencies. Once this preliminary function has been performed, MUX 312 is programmed to couple its second input to its output (as is shown in the configuration of module 400-c of FIG. 4c).

Next, the stored $G'_N$ signal in first RAM 214 is read out at one-half column and row clock frequencies and applied through MUX 206 to IN 1, while, at the same time, the $L_{N-1}$ signal stored in the external frame store 102 is read out at full column and row clock frequencies and applied through video input bus 222 and MUX 208 to IN 2. However, the respective programming of the read out timing control of frame store 102 and of first RAM 214 is such that the read out $G'_N$ signal from first RAM 214 is delayed by exactly two horizontal scan line periods with respect to the read out $L'_{N-1}$ signal from the frame store 102. This ensures that each filter sample of the filtered $G'_N$ output from filter 300 applied as a second input to summer 314 occurs in time coincidence with its corresponding pixel sample applied as a first input to summer 314 (as shown in FIG. 4c).

The result is that filter logic unit 200 derives the $G'_{N-1}$ signal at OUT 2 thereof. Second RAM 216 and MUX 210 are programmed to apply this $G'_{N-1}$ signal as a write input to second RAM 216.

The whole process is now repeated with the stored $L'_{K-2}$ signal being read out of frame store 102 and being applied through video input bus 222 and MUX 208 to IN 2, and the stored $G'_{N-1}$ signal being read out from second RAM 216 and applied through MUX 206 to IN 1. The result is that the $G'_{N-2}$ signal is derived now at OUT 2 and applied through MUX 210 as a write input to first RAM 214.

The above-described process may be repeated (wherein the first and second RAMS 214 and 216 are alternately employed for storing each successively lower $G'$ signal derived at OUT 2, followed by the reading out of this RAM and the forwarding of its stored $G'_K$ signal through MUX 206 to IN 1, at the same time that its associated $L'_{K-1}$ signal is being read out from frame store 102 and applied over bus 222 and MUX 208 to IN 2). This repeated process continues until the $G'_0$ signal (i.e., a fully restored signal is synthesized) is ultimately derived at OUT 2 of filter logic unit 200. When this happens, MUX 210 is programmed to forward the $G'_0$ signal through programmable delay 228 to the video output 226 of pyramid processing apparatus 100, for use by the rest of the signal processing system shown in FIG. 1. By way of example, the synthesized $G'_0$ may be used for displaying the restored image by monitor 128 with or without further processing by the ALU of element 104 and with or without further delay in frame store 102. Alternatively, the synthesizer $G'_0$ may be applied to some other utilization device (not shown).

So far, it has been assumed that the pyramid processing apparatus is operating on a video signal input consisting of only the first field of each of successive image frame of an NTSC video signal. However, this is not an essential limitation.

In some cases, in which the amount of image information that is required is even smaller, the video input signal to the pyramid processing apparatus can consist of only one field of alternate ones of the successive frames of an NTSC signal (i.e., each 1/60 sec. field period in which new information is presented is followed by a 3/60 sec. void interval). In such cases, there is more than enough time, using time multiplexing techniques, to implement a Burt Pyramid analyzer with a filter logic unit 200 comprised of only a single module. More specifically, the single module is first programmed as a 400-1a filter module (FIG. 4a) to provide a $G_K$ signal, which is stored in one of first and second RAMS 214 and 216. Thereafter, the single module is programmed as a 400-2a module, (FIG. 4a), and the stored $G_K$ signal is read out of that one of first and second RAMS 214 and 216 in which it is stored and applied as an input to the single module in its 400-2a. configuration, thereby deriving the $L_{K-1}$ signal as an output therefrom.

Pyramid processing apparatus 100 can also be implemented so that it can operate on a complete NTSC video signal, after it has been coverted in form to a digitally sampled progressive-scan video signal. There are two ways of accomplishing this. The first way is to separate a progressive-scan video signal into first and second channels, with the first channel being comprised of only alternate ones of the successive frames of the progressive-scan video signal and the other channel being comprised of the remaining frames of the progressive-scan video signal. The pixel samples of an successive frame constitutes a progressive-scan video signal $G_0$ that occurs during each of successive contiguous 1/60 sec. frame-period intervals. Each of the channels is provided with its own pyramid processing apparatus 100 (with the operation of the pyramid processing apparatus of one channel being delayed by one field period with respect to the operation of the pyramid processing apparatus of the other channel). The second way is to pass the progressive-scan video signal $G_0$ through a data compressor so that each successive frame at the output of the data compressor now occurs during a first 1/120 sec. interval that is followed by a second 1/120 sec. null interval. This permits a single pyramid processing apparatus 100, operating at a double clock frequency, to be employed.

So far, the present invention has been described in connection with an image comprised of 2-dimensional spatial image information. However, the present invention, may be implemented to operate with an information component of a sampled temporal signal having less or more than two dimensions. Thus, in general, the principles of the present invention are applicable to programmable pyramid processing apparatus utilizing digital techniques for operating, during each of successive time cycles, on a series of temporal signal samples that define at least one block of an n-dimensional information component, where n is a given integer of at least one, each of the time cycles being composed of a certain number of sample periods that is at least as large as the number of temporal signal samples in the series.

Furthermore, pyramid processing apparatus 100 is not limited to only implementing those algorithm pertaining to the Burt Pyramid analyzer, or the FSD pyramid analyzer, or the pyramid synthesizer discussed in detail above.

Pyramid processing apparatus 100 may also be employed for implementing any other desired pyramid algorithm using a programmable filter logic unit for deriving a set of one or more sampled-signal outputs therefrom as specified selectable functions of a set of one or more sampled-signal inputs thereto in accordance with the values of digital control signals applied to the programmable filter logic unit. The filter logic unit may be comprised of one or more programmable filter logic unit modules having the structuring shown in FIG. 3, or, alternatively, the filter logic unit may be comprised of one or more programmable filter logic unit modules having structure different from that shown in FIG. 3.

Furthermore, the programmable techniques of the present invention are useful in performing other types of multiresolution processing, in addition to pyramid processing. For instance, the present invention is useful for such purposes as sampling a selected sub-area of an image with a resolution that varies as an inverse function of the size of the sub-area.

What is claimed is:

1. In a delayed real time multiresolution processing apparatus utilizing digital techniques for operating during each of successive time cycles at respective levels of resolution which respective levels of resolution differ from each other, on a series of termporal signal samples that define at least one block of an n-dimensional information component, where n is a given integer of at least one, each of said time cycles being composed of a certain number of sample periods that is at least as large as the number of temporal signal samples in said series; the combination comprising:

a programmable filter logic unit for deriving during each successive time cycle a set of one or more sampled-signal outputs therefrom as specified selectable functions of a set of one or more sampled-signal inputs thereto in accordance with the values of applied first digital control signals, whereby said programmable filter logic unit sequentially performs processing at each of said respective levels of resolution;

a plurality of addressable read/write memory means each of which is separately addressable in each of said n dimensions, each of said memory means being controllable in accordance with the values of applied second digital control signals;

programmable coupling means including a first set of multiplexers (MUX) individually associated with each of said filter logic unit outputs and a second set of MUX individually associated with each of filter logic unit inputs for selectively coupling:

(1) any filter logic unit output as a write-input to a selected one of at least two of said memory means through that one of said first set of MUX individually associated with that filter logic unit output, (2) the read-output of any one of said at least two of said memory means to a selected one of said filter logic unit inputs through that one of said second set of MUX individually associated with that filter logic unit input, (3) any filter logic unit output directly to any selected one of said filter logic unit inputs through those respective ones of said first and second sets of MUX that are individually associate with that filter logic unit output an that selecte one of said filter logic unit inputs, and (4) an applied external series of said temporal signal samples to any selected one of said filter logic unit inputs through that one of said second set of MUX individually associated with that selected one of said filter logic unit inputs, all in accordance with the values of applied third digital control signals; and timing and control means for deriving and applying said respective first, second and third digital control signals which together determine the level of resolution of processing done by said programmable filter logic unit during each said successive time cycle, said timing and control means including addressable instruction memory means for determining the respective values of said first, second and third digital control signals during each one of said certain number of sample periods in each of said time cycles.

2. The apparatus defined in claims 1, wherein:
said delayed real time multiresolution processing apparatus is comprised of delayed real time pyramid processing apparatus.

3. In a delayed real time pyramid processing apparatus utilizing digital techniques for operating, during each of successive time cycles, on a series of temporal signal samples that define at least one block of an n-dimensional informaation component, where n is a given integer of at least one, each of said time cycles being composed of a certain number of sample periods that is at least as large as the number of temporal signal samples in said series; the combination comprising:

programmable filter logic unit for deriving a set of one or more sampled-signal outputs therefrom as specified selectable functions of a set of one or more sampled-signal inputs thereto in accordance with the values of applied first digital control signals;

a plurality of addressable read/write memory means each of which is separately addressable in each of said n dimensions, each of said memory means being controllable in accordance with the values of applied second digital control signals;

programmable coupling means including a first set of multiplexers (MUX) individually associated with each of said filter logic unit outputs and a second set of MUX individually associated with each of filter logic unit inputs for selectively coupling:

(1) any filter logic unit as a write-input to a selected one of at least two of said memory means through that one of said first set of MUX individually associated with that filter logic unit output, (2) the read-output of any one of said at least two of said memory means to a selected one of said filter logic unit inputs through that one of said second set of MUX individually associated with that filter logic unit input, (3) any filter logic unit output directly to any selected one of said filter logic unit inputs through those respective ones of said first and second sets of MUX that are individually associated with that filter logic unit output and that selected one of said filter logic unit inputs and (4) an applied external series of said temporal signal samples to any selecte one of said filter logic unit input through that one of said second set of MUX individually associate with that selecte one of said filter logic unit inputs, all in accordance with the values of applied third digital control signals; and timing and control means for deriving and applying said respective first, second and third digital control signals, said timing and control means including addressable instruction memory means for determining the respective values of said first, second and third digital control signals during each one of said certain number of sample period in each of time cycles—wherein:

said series of temporal signal samples define the spatial frequency spectrum of a two-dimensional image;

said filter logic unti is comprised of at least one given filter logic unit module having first and second signal inputs for sampled signals, a control input for said first digital control signals, and first and second signal outputs for sampled signals; and said given module includes a multitap two-dimensional digital filter having a given number of hernel weighting function coefficients in each dimension which are programmable in accordance with said first digital control signals applied to said control input, a first MUX for selectively applying a sampled signal applied to said first signal input or a ZERO word as a filter input to said digital filter in accordance with said first digital control signals applied to said control input, whereby said digital filter inserts a given delay equal to the sum of delays in each of its two dimensions between its filter input and its filtered output, first programmable delay means for selectively delaying said filter input by a given amount equal to the longer of the delays in each of said filter's two dimensions or by twice said given amount in accordance with said first digital signals applied to said control input, second delay means for inserting a delay equal to the shorter of the delays in each of said filter's two dimesnions, a second MUX for selectively applying a sampled signal applied to said second signal input or said delay filter input as an input to said second delay means in accordance with said first digital control signals applied to said control input, an arithmetic logic unit (ALU) for selectively adding or subtracting a sampled signal applied to its second input to or from a sampled signal applied to its first input in accordance with said first digital control signals applied to said control input, means for applying the output of said second delay means as said sampled signal to said first input of said ALU, means for applying the delayed filtered output of said filter to said first signal output and also as said sampled signal to said second input of said ALU, and a third MUX for selectively applying the output of said second delay means or the sampled signal output from said ALU to said second signal output in accordance with said first digital control signals applied to said control input.

4. The apparatus defined in claim 3, wherein:

said filter logic unit is comprised of a single given filter logic unit module; and said timing and control means provides first digital control signals to said single given module which result in (1) its first MUX always applying said sampled signal applied to its first signal input to its filter input, (2) its first delay means providing a delay equal to said given amount of delay, (3) its second MUX always applying its delayed filter input to the input of its second delay means, (4) its ALU always subtracting the sampled signal applied to the second input thereof from the sampled signal applied to the first input thereof, and (5) its third MUX always applying the output of its ALU to its second signal output;

whereby said filter logic unit operates as a filter-subtract-deimate (FSD) pyramid analyzer stage.

5. The apparatus defined in claim 3, wherein:

said filtler logic unit is comprised of first and second given filter logic unit modules, with said first and second signal inputs of said given module being respectively connected to said first and second signal outputs of said first given module;

said timing and control means provides first digital control signals to said first given module which result in (1) its first MUX always applying said sampled signal applied to its first signal input to its filter input, (2) its first delay means providing a delay equal to twice said given amount of delay, (3) its second MUX always applying its delayed filter input to the input of its second delay means, and (4) its third MUX always applying the output of its second delay means to its second signal output; and said timing and control means provides first digital control signals to said second given module which result in (5) its first MUX alternatively applying said sampled signal applied to its first signal input and said ZERO word to its filter input, (6) its second MUX always applying said sampled signal applied to its second signal input to the input of its second delay means (7) its ALU always subtracting the sampled signal applied to the second input thereof from the sampled signal applied to the first input thereof, and (8) its third MUX always applying the output of its ALU to its second signal output;

whereby said filter logic unit operates as a Burt Pyramid analyzer stage.

6. The apparatus defined in claim 3, wherein: said filter logic unit is comprised of a single given filter logic unit module; and said timing and control means provides first digital control signals to sad single given module which result in (1) its first MUX alternatively applying said sampled signal applied to its first signal input and said ZERO word to its filter input, (2) its second MUX always applying the sampled signal applied to its second signal input to the input of its second delay means, (3) its ALU adding the sampled signal applied to the second input thereof to the sampled signal applied to the first input thereof, and (4) its third MUS always applying the output of its ALU to its second signal output;

whereby said filter logic unit operates as a pyramid synthesizer stage.

7. The apparatus defined in claim 1, wherein:

said addressable isntruction memory means is comprised of a programmable reads-only-memory (PROM) that stores an instruction program at predetermined addresses thereof.

8. The apparatus defined in claim 1, wherein:

said addressable instruction memory means is comprised of a random-access-memory (RAM), and means for storing an instruction program at predetermined addresses in said RAM.

9. In a delayed real time pyramid processing apparatus utilizing digital techniques for operating, during each of successive time cycles, on a series of temporal signal samples that define at least one block of an n-dimesnional information component, where n is a given integer of at least one, each of said time cycles being composed of a certain number of sample periods that is at least as large as the number of temporal signal samples in said series; the combination comprising:

a programmable filter logic unit for deriving a set of one or more sampled-signal outputs therefrom as specified selectable functions of a set of one or more sampled-signal inputs thereto in accordance with the values of applied first digital control signals;

a plurality of addressable read/write memory means each of which is separately addressable in each of said n dimesnions, each of said memory means being controllable in accordance with the values of applied second digital control signals;

programmable coupling means including a first set of multiplexers (MUX) individually associated with each of said filter logic unit outputs and a second set of MUX individually associated with each of filter logic unit inputs for selectively coupling:

(1) any filter logic unit output as a write-input ot a selected one of at least two of said memory means through that one of said first set of MUX individually associated with that filter logic unit output, (2) the read-output of any one of said at least two of said memory means to a selected one of said filter logic units through that one of said second set of MUX individually associated with that filter logic unit input, (3) any filter logic unit output directly to any selected one of said filter logic unit inputs through those respective ones of said first and second sets of MUX that are individually associated with that filter logic unit output and that selected one of said filter logic unit inputs, and (4) an applied external series of said temporal signal samples to any selected one of said filter logic unit inputs through that one of said second set of MUX individually associated with that selected one of said filter logic unit inputs, all in accordance with the values of applied third digital control signals; and timing and control means for deriving and applying said respective first, second and third digital control signals, said timing and control means including addressable instruction memory means for determining the respective values of said first, second and third digital control signals during each one of said certain number of sample periods in each of said time cycles—wherein:

said instruction memory means includes a memory that stores an instruction program at predetermined addressed thereof and an address counter incremented by each of successive clock signals applied thereto, said address counter being coupled to said memory for addressing that instruction of said program which is stored at the address then registered in said address counter, thereby causing said memory to read out the addressed instruction from said memory; and said timing and control means further includes instruction decode means responsive at least in part to the read out instruction from said memory for selectively generating at least one given control signal, and means responsive to said one given control signal being generated for jam loading the instruction then being read out of said memory into said address counter.

10. The apparatus defined in claim 9, wherein:

said isntruction decode means selectively generates a second given control signal in addition to sasid one given control signal, and said timing and control means includes a cycle timer having a given count capacity which is incremented by each of successive clock signals applied thereto, said cycle timer applying a flag control input to said instruction decode means in response to registering a predetermined count for affecting the operation of said instruction decode means, and means responsive to the generation of said second given control signal for jam loading the instruction then being read out of said memory into said cycle timer.

11. The apparatus defined in claim 9, wherein:

said instruction decode means selectively generates a second given control signal in addition to said one given control signal and also generates a "clock one" signal in response to at least one predetermined instruction being read out of said memory; and said timing and control means includes a loop counter having a given count capacity which is incremented by each "clock one" signal applied thereto from said instruction decode means, said loop counter applying a flag control input to said instruction decode means in response to registering a predetermined count for affecting the operation of said instruction decode means, and means responsive to the generation of said second given control signal for jam loading the instruction then being read out of said memory into said loop counter.

12. The apparatus defined in claim 9, wherein:

said series of temporal signal samples are derived from a television video signal comprised of successive telelvision fields each of which is comprised of a plurality of horizontal scan lines;

means for applying a $V_B$ video control signal indicative of vertical blanking and an $E_B$ video control signal indicative of horizontal blanking as respective control inputs to said instruction decode means.

* * * * *